(No Model.) 3 Sheets—Sheet 1.

F. CHALLONER.
DOG GUIDING AND OPERATING MECHANISM FOR SHINGLE SAWING MACHINES.

No. 560,687. Patented May 26, 1896.

Witnesses:
E. B. Asmus
Chas. L. Goss

Inventor:
Frank Challoner
By Witter Kenyon Smith Botham & Jones
Attorneys.

ANDREW B. GRAHAM, PHOTO-LITHO. WASHINGTON, D.C.

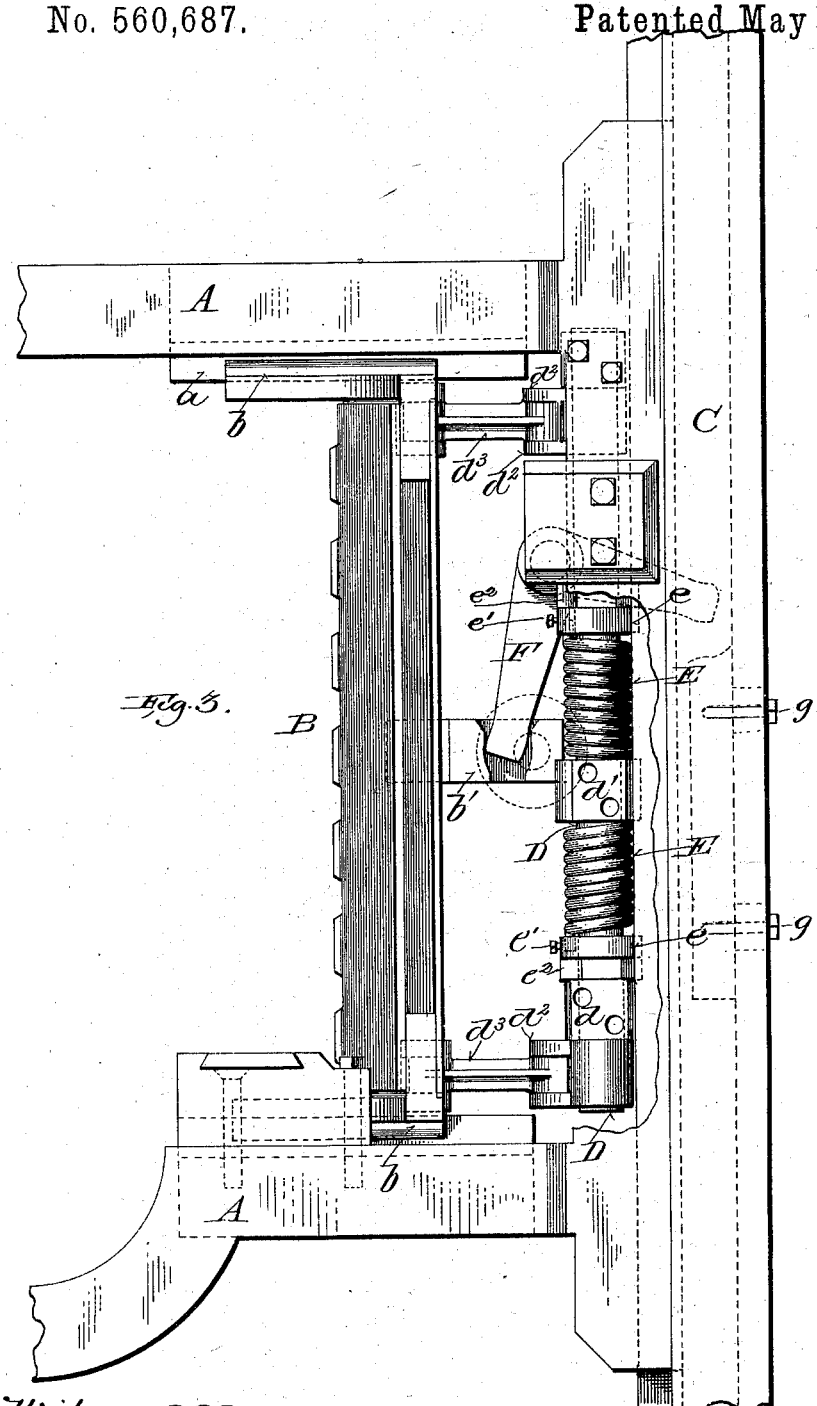

(No Model.)
F. CHALLONER.
DOG GUIDING AND OPERATING MECHANISM FOR SHINGLE SAWING MACHINES.
No. 560,687. Patented May 26, 1896.
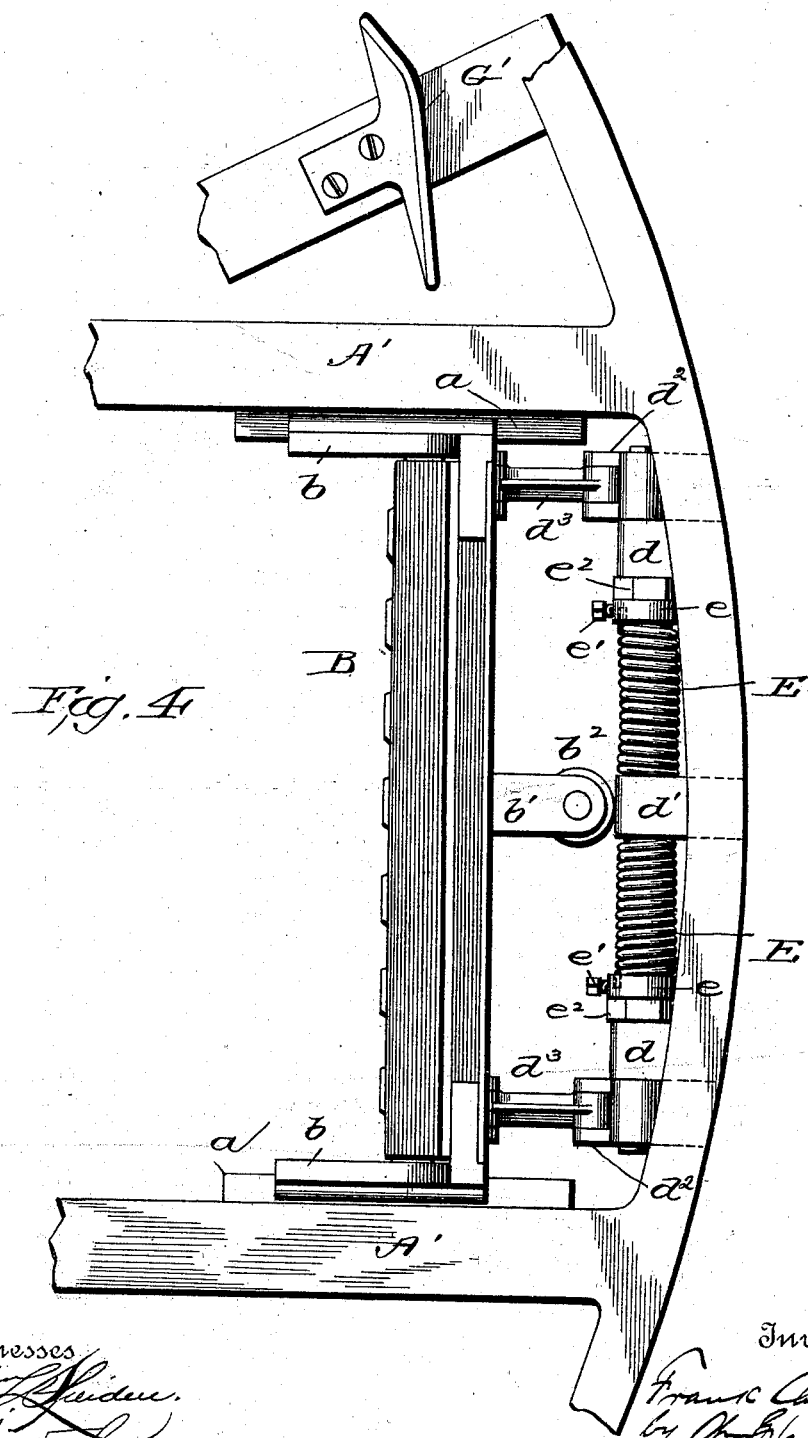

UNITED STATES PATENT OFFICE.

FRANK CHALLONER, OF OSHKOSH, WISCONSIN.

DOG GUIDING AND OPERATING MECHANISM FOR SHINGLE-SAWING MACHINES.

SPECIFICATION forming part of Letters Patent No. 560,687, dated May 26, 1896.

Application filed August 28, 1891. Serial No. 403,967. (No model.)

*To all whom it may concern:*

Be it known that I, FRANK CHALLONER, of Oshkosh, in the county of Winnebago and State of Wisconsin, have invented certain new and useful Improvements in Dog Guiding and Operating Mechanism for Shingle-Sawing Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.
The main object of my invention is to prevent the binding of the movable dog in its ways and the consequent wear thereof.

It consists of certain peculiarities in the construction and arrangement of the dog guiding and operating mechanism hereinafter particularly described, and pointed out in the claims.

Figure 1:
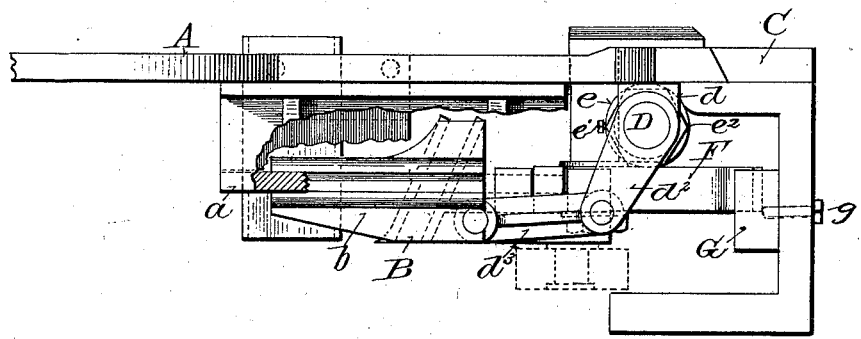
Figure 2:
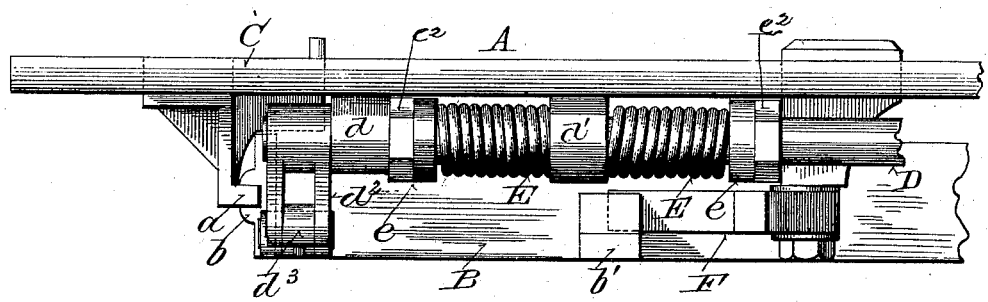

In the accompanying drawings like letters designate the same parts in the several figures.
Figure 1 is a front elevation of a portion of a reciprocating carriage of a shingle-sawing machine, together with the movable dogs to which my improvements are applied, a portion of the front dog way or guide being broken away. Fig. 2 is a side elevation of the carriage with the movable dog and its connections. Fig. 3 is a plan view, a portion of the side of the carriage being broken away to disclose the dog guiding and actuating mechanism underneath; and Fig. 4 is a plan view of a modification of the device, showing its adaptation to a rotary machine.

Referring to Figs. 1 to 3, inclusive, A represents a portion of a reciprocating carriage of the usual or any suitable construction for use in machines of this class. It is provided in the usual manner with ways $a\ a$, upon which the movable dog is supported and guided at the ends.
B represents the movable dog, of the usual construction, provided at the ends with suitable guides $b\ b$, adapted to slide upon the ways $a\ a$.

C is one of the carriage guiding and supporting ways.

D is a rock-shaft mounted in suitable bearings $d\ d'$, provided for the purpose at one side and preferably a little below the carriage A. It is provided with two or more crank-arms $d^2\ d^2$, formed thereon or rigidly attached thereto at or near its ends, and these arms are connected by links $d^3$ with the ends of the movable dog B. Upon the shaft D are mounted spiral springs E E, which are secured at one end to the middle bearing $d'$ and at their opposite ends to collars $e\ e$, which are capable of being turned upon the shaft D, so as to change the tension of said springs, and are secured in place when properly adjusted by set-screws $e'\ e'$ or other suitable means. The springs E are arranged to close the dog or move it into engagement with a shingle-bolt placed in the carriage. A portion $e^2$ of each of the collars $e\ e$ is squared for the purpose of turning the same to adjust the tension of the springs E E.

As ordinarily constructed and guided the movable dogs of shingle-sawing machines when brought into engagement with a narrow bolt are caused to bind in or on their ways. The bearings are consequently unnecessarily worn, besides causing the dog to work unsatisfactorily. By the employment of my improved guiding connections both ends of the dog are compelled to move together alike, whatever the width of the bolt or its position in the carriage may be.

In connection with reciprocating carriages I provide for opening the dog and releasing the bolt at the proper point in the travel of the carriage a bell-crank lever F, fulcrumed to the side of the carriage and having at the ends formations similar to gear-teeth, one of which engages with a corresponding recess in the tailpiece $b'$ of the dog and the other with an adjustable trip-block G, attached to the frame of the machine in the required position to be engaged by the lever F as the carriage is completing its return movement. The trip-block G may be adjustably secured to the frame by screws $g\ g$, passing through horizontal slots in one of the side pieces, as indicated by dotted lines in Fig. 3.

Referring to Fig. 4, showing a portion of the carriage A' of a rotary machine, the tailpiece $b'$ of each movable dog is provided with a roller $b^2$, and one or more fixed inclines or cams G' are located at the proper point or points in the circuit of said rollers to engage the same and move the dogs with which they are connected outwardly, thus releasing and dropping the bolts at the desired point or points in the movement of the carriage. In this application of the device the roller $b^2$ and incline G' take the place of the lever F and trip-block G employed with a reciprocating carriage.

Various changes in details of construction may be made within the spirit of my invention.

I claim—

1. In a shingle-sawing machine the combination with the movable dog and its ways, of a rock-shaft supported by suitable bearings transversely to said ways and provided with arms which are connected by links with said dog so as to compel both ends thereof to move together, a spring tending to close said dog and a trip arranged to automatically open the dog at the desired point, substantially as and for the purposes set forth.

2. In a shingle-sawing machine the combination with the movable dog and its ways of a rock-shaft supported by suitable bearings transversely to said ways and provided with arms which are connected by links with said dog so as to compel both ends thereof to move together, an adjustable spring tending to close said dog and an adjustable trip arranged to automatically open said dog at the desired point against the tension of said spring, substantially as and for the purposes set forth.

3. In a shingle-sawing machine the combination with the movable dog and its ways of a rock-shaft supported by suitable bearings transversely to said ways and provided with arms which are connected by links with said dog so as to compel both ends thereof to move together, a spiral spring coiled about said rock-shaft and attached at one end to the support of said shaft and at the other to a collar adjustably secured on said shaft so as to vary the tension of the spring which tends to close said dog, and a trip arranged to automatically open said dog at the desired point, substantially as and for the purposes set forth.

4. In a shingle-sawing machine, the combination with a reciprocating carriage provided with a movable dog and suitable ways therefor of a rock-shaft supported by suitable bearings in said carriage transversely to said ways and provided with arms which are connected by links with said dog, a spring tending to close said dog, a bell-crank lever fulcrumed at its elbow to the carriage and engaging at one end with said dog, and a trip arranged in the path of the other end of said lever to open said dog at the desired point, substantially as and for the purposes set forth.

5. In a shingle-sawing machine the combination with a reciprocating carriage provided with a movable dog and suitable ways therefor of a rock-shaft supported by suitable bearings in said carriage transversely to said ways and provided with arms which are connected by links with said dog, a spring tending to close said dog, a bell-crank lever fulcrumed at its elbow to the carriage and engaging at one end with said dog, and a trip adjustably attached to the frame of the machine in the path of the other end of said lever and movable parallel with said ways so as to open said dog at the desired point, substantially as and for the purposes set forth.

6. In a shingle-sawing machine the combination with the movable dog and its ways of a rock-shaft supported by suitable bearings transversely to said ways and provided with arms which are connected by links with said dog so as to compel both ends thereof to move together, spiral springs coiled around said shaft and attached at one end to its middle bearing and at the opposite ends to collars adjustably secured upon said shaft and capable of being turned thereon so as to vary the tension of said springs which tend to close said dog, and a trip arranged to open the dog against the tension of said springs at the desired point, substantially as and for the purposes set forth.

In testimony that I claim the foregoing as my own I affix my signature in presence of two witnesses.

FRANK CHALLONER.

Witnesses:
CHAS. L. GOSS,
E. G. ASMUS.